US008832650B2

(12) United States Patent
MacPhail

(10) Patent No.: US 8,832,650 B2
(45) Date of Patent: Sep. 9, 2014

(54) AUTOMATED CODE GENERATION FOR AN AUTOMATED TELLER MACHINE

(75) Inventor: Stephen N. MacPhail, Dundee (GB)

(73) Assignee: NCR Corporation, Duluth, GA (US)

( * ) Notice: Subject to any disclaimer, the term of this patent is extended or adjusted under 35 U.S.C. 154(b) by 979 days.

(21) Appl. No.: 11/904,090

(22) Filed: Sep. 26, 2007

(65) Prior Publication Data

US 2009/0083700 A1  Mar. 26, 2009

(51) Int. Cl.
*G06F 9/44* (2006.01)
(52) U.S. Cl.
CPC .................................... *G06F 8/34* (2013.01)
USPC ............................ 717/121; 717/101; 717/102
(58) Field of Classification Search
CPC ............. G06Q 10/06; G06F 8/20; G06F 8/71; G06F 9/44505
See application file for complete search history.

(56) References Cited

U.S. PATENT DOCUMENTS

| | | | | |
|---|---|---|---|---|
| 5,933,645 | A * | 8/1999 | Wallack | 717/170 |
| 7,124,400 | B2 * | 10/2006 | Mortensen et al. | 717/121 |
| 7,584,207 | B2 * | 9/2009 | Mortensen et al. | 717/121 |
| 7,631,299 | B2 * | 12/2009 | Kannenberg | 717/121 |
| 7,693,790 | B2 * | 4/2010 | Lawlor et al. | 705/40 |
| 7,720,711 | B2 * | 5/2010 | Taylor | 705/16 |
| 7,774,369 | B2 * | 8/2010 | Herzog et al. | 717/121 |
| 7,805,131 | B2 * | 9/2010 | Cholkar et al. | 455/414.1 |
| 7,926,030 | B1 * | 4/2011 | Harmon | 717/121 |
| 8,011,571 | B2 * | 9/2011 | Hurrell | 235/379 |
| 8,219,476 | B1 * | 7/2012 | Wang | 717/121 |
| 8,255,871 | B1 * | 8/2012 | Kompella et al. | 717/121 |
| 8,255,901 | B2 * | 8/2012 | Halbedel et al. | 717/101 |
| 8,387,025 | B2 * | 2/2013 | Surasinghe | 717/121 |
| 2003/0074342 | A1 * | 4/2003 | Curtis | 707/1 |
| 2003/0217005 | A1 * | 11/2003 | Drummond et al. | 705/43 |
| 2004/0193913 | A1 * | 9/2004 | Han et al. | 713/200 |
| 2004/0250255 | A1 * | 12/2004 | Kraiss et al. | 719/310 |
| 2005/0193104 | A1 * | 9/2005 | Mason et al. | 709/223 |
| 2006/0031160 | A1 * | 2/2006 | Villa | 705/44 |
| 2006/0080636 | A1 * | 4/2006 | Hsieh | 717/101 |
| 2006/0089908 | A1 * | 4/2006 | Keohane et al. | 705/43 |
| 2006/0101374 | A1 * | 5/2006 | Lim et al. | 717/102 |
| 2006/0195816 | A1 * | 8/2006 | Grandcolas et al. | 717/101 |
| 2007/0150749 | A1 * | 6/2007 | Monaghan et al. | 713/189 |
| 2007/0162388 | A1 * | 7/2007 | Hamilton et al. | 705/43 |
| 2007/0208686 | A1 * | 9/2007 | Gupta et al. | 707/1 |
| 2008/0071887 | A1 * | 3/2008 | Gaurav et al. | 709/220 |

(Continued)

OTHER PUBLICATIONS

Wang et al., "The Formal Design Model of an Automatic Teller Machine (ATM)", Jan.-Mar. 2010, IGI Global, pp. 102-131; <www.igi-global.com/chapter/formal-design-model-automatic-teller/64613>.*

(Continued)

*Primary Examiner* — Thuy Dao
*Assistant Examiner* — Ben C Wang
(74) *Attorney, Agent, or Firm* — Joseph P. Merhle

(57) ABSTRACT

Systems and methods are described herein that facilitate the generation of code for customized applications using graphical elements presented to a user. In some embodiments, the system presents a wizard that guides a user through various selections of options related to business rules, receives selections of desired options via a graphical user interface, and generates code based on the selections. In some embodiments, the system is configured to facilitate the creating of customized applications that provide a computing architecture for business services, such as business services provided to customers at automated teller machines.

13 Claims, 5 Drawing Sheets

(56) References Cited

U.S. PATENT DOCUMENTS

| | | | |
|---|---|---|---|
| 2008/0274755 A1* | 11/2008 | Cholkar et al. | 455/461 |
| 2009/0182638 A1* | 7/2009 | Taylor | 705/17 |
| 2009/0200365 A1* | 8/2009 | Hurrell | 235/375 |
| 2009/0212105 A1* | 8/2009 | Couper et al. | 235/379 |
| 2011/0132981 A1* | 6/2011 | Smith et al. | 235/379 |
| 2012/0044154 A1* | 2/2012 | Black et al. | 345/173 |
| 2012/0297358 A1* | 11/2012 | Kumar et al. | 717/102 |
| 2012/0312870 A1* | 12/2012 | Ma et al. | 235/379 |
| 2013/0332896 A1* | 12/2013 | Narayana et al. | 717/101 |

OTHER PUBLICATIONS

Liew et al., "A Framework for Business Model Driven Development", 2004 IEEE, STEP'04, Sep. 17-19, 2004, pp. 1-8; <http://ieeexplore.ieee.org/stamp/stamp.jsp?tp=&arnumber=1613370>.*

Bordin et al., "Real-Time Java from an Automated Code Generation Perspective", 2007 ACM, JTRES '07, Sep. 26, 2007, Vienna, Austria, pp. 63-72; <http://dl.acm.org/results.cfm?h=1&source_query=&&cfid=446850340&cftoken=30083272>.*

* cited by examiner

AUTOMATED CODE GENERATION FOR AN AUTOMATED TELLER MACHINE

BACKGROUND

Developers of many application programs ("applications") implement the applications so that they can be customized by third parties. Typically, to customize an application received from a developer, a third party develops custom code (e.g., add-ins and document-level customizations) that uses functionality exposed by the application. The custom code may improve the usability of the applications or provide additional functionality (e.g., domain-specific functionality). Developers may provide "runtimes" that facilitate the development of custom code. A runtime is code that is loaded along with custom code and provides services to the custom code. These services may include higher-level functionality than that exposed by the application or may include domain-specific functionality. When an application is to load and start the execution of custom code, the application may load the runtime and direct the runtime to load and start the execution of the custom code.

The Microsoft®.NET Framework provides programming experience is generally characterized by utilization of a class library, operating on objects through properties and events, and other features. The .NET Framework provides a common language runtime ("CLR") that provides high-level operating system type services to the managed programs (including custom code and applications) and serves as an execution engine for managed programs. The CLR ensures that managed programs do not take any unauthorized action. The CLR provides application domains ("appdomains") in which different managed programs can execute to help ensure that an errant managed program will not unduly affect the execution of another managed program.

However, despite the many resources provided by the .NET Framework that act to develop and manage executable code, third parties that receive applications may be unfamiliar with certain functions of the environment, and may spend much time and effort in customizing applications. For example, they may be unfamiliar with the methodology or structure of the underlying code or the language in which the code is written (e.g., Microsoft's® C# programming language is often used in developing code using .NET Framework and may be unfamiliar to a third party).

Additionally, the third party may be a customer of the application provider, and may wish to quickly customize a received base application and implement the customized application for public consumption. For example, banks and other financial institutions provide cash and other services to the public via automated teller machines (ATMs). At times, the needs of the public and/or the financial institution change, and the financial institution may want to change how the ATM interacts with the public and/or with the institution.

These and other problems exist with respect to providing customized applications to customers.

DETAILED DESCRIPTION

A system and method is provided that allows users to create and/or modify executable code using a user interface element, such as a wizard. The system may receive input from users via user interface elements, create or modify code based on the received input, and implement the code into a base application to customize the application. The system may receive user input via a graphical user interface (GUI) element, such as a wizard, and generate and/or modify code using .NET.

In some embodiments, the system may customize applications to be used in ATM machines. For example, the applications may display information to users of ATMs, may receive input from the users, may transmit and receive messages to and from host systems, may detect events that have or have not occurred at the ATMs, and so on. The applications may interact with or support various "translets." A translet is a component that provides one or more types of services to a user of an ATM. For example, a translet may provide account services, card or member services, financial supplies services, device management services, key or security services, and other services required or utilized during transactions or attempted transactions between a user and an ATM. The system, therefore, may enable a customer to modify the functionality of a translet or of selected translets, or may enable a customer to modify the functionality of an entire application.

In some embodiments, the system provides a wizard to a user that guides the user through the customization of applications. The user does not have to write any code, as some or all of the code is generated by the wizard and implemented into the code of the application. The system enables a user to quickly and easily adapt, modify and/or customize a generic base application to meet the needs of the user, among other benefits.

Figure 1:
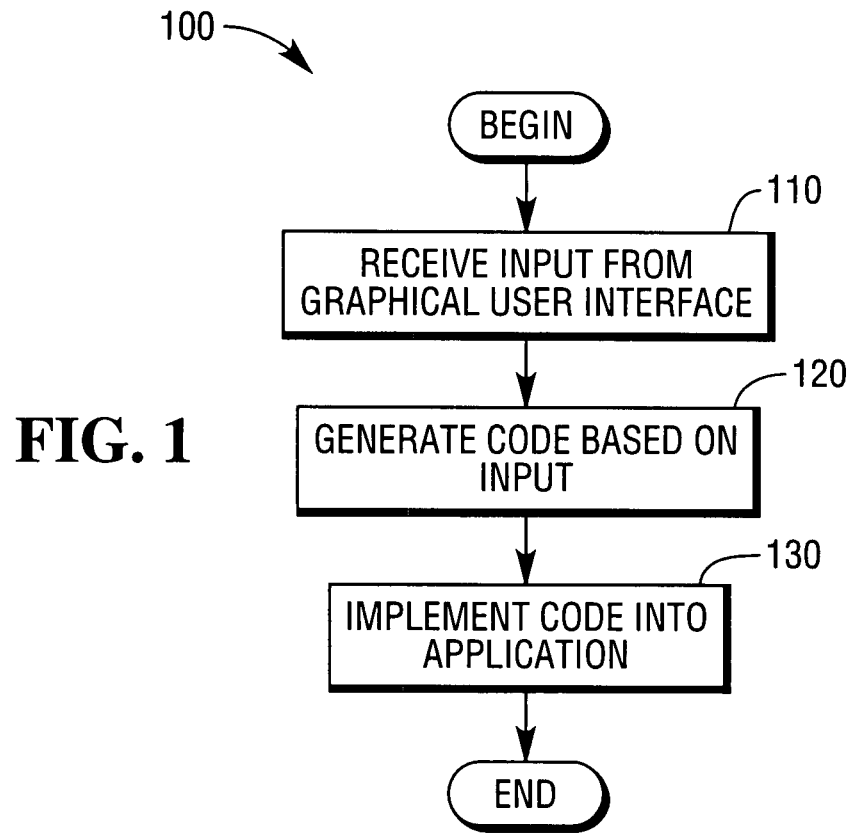
FIG. 1 is a flow diagram illustrating a routine for creating a customized application.

Referring to FIG. 1, a flow diagram illustrating a routine 100 for creating a customized application using a graphical user interface is shown. In step 110, the system receives input via a graphical element, such as via objects presented to a user via a graphical user interface. In some cases, the user may select an object, such as by clicking on an object with a mouse or other pointing device (touch pad, keyboards, and so on). In some cases, the user may directly select an object via a touch screen or other display.

In step 120, the system generates code based on, related to or associated with the selected object. In some cases, the system may retrieve a pre-generated code snippet associated with the object and generate code based on the retrieved code. In some cases, the system may define parameters or instructions based on the object and generate code based on the defined parameters or instructions.

In step 130, the system implements the code into an application, such as a base application that defines a base architecture. For example, the system may create a configuration file containing the generated code, and transmit the configuration file to an application generation environment, such as the .NET environment discussed herein. The system may then implement the contents of the configuration file into the base architecture to create the customized application.

Figure 2:
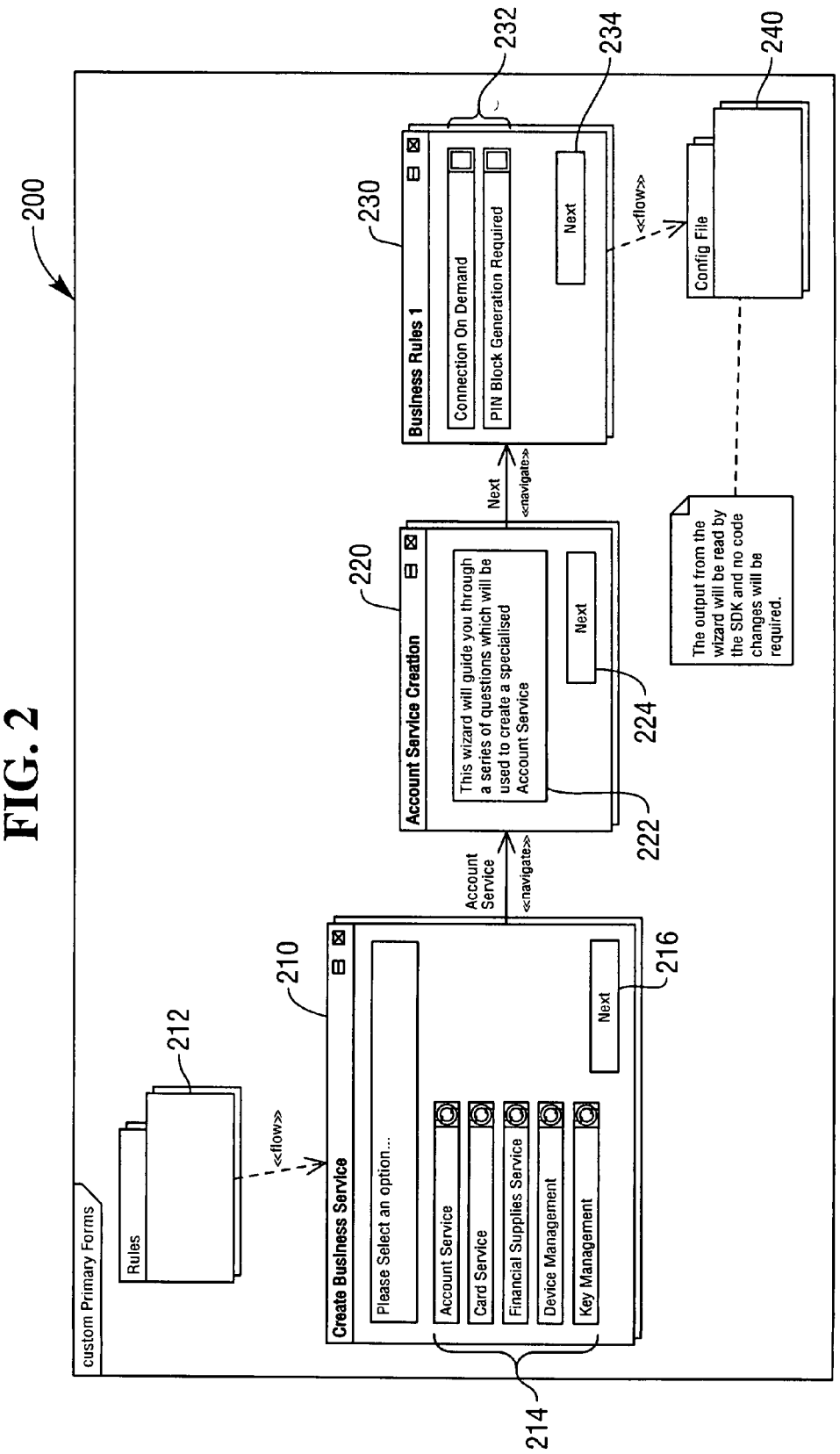
FIG. 2 is a block diagram illustrating a wizard used to create a customized application.

In some embodiments, the system performs some or all of routine 100 via a wizard application. Referring to FIG. 2, a block diagram illustrating a wizard 200 used to create a customized application is shown. The wizard 200 may display a variety of graphical elements within a graphical user interface, including text boxes, user-selectable objects, user input objects, and so on. For example, upon receiving an indication from a user to customize a base application that provides a base architecture for a service, the system launches an introductory interface 210 to be displayed to a user. In this embodiment, interface 210 is generated from a rules engine 212 that defines or instructs possible functionality or features of the application. In some cases, the rules engine defines some or all possible services provided by the application. In some cases, the rules engine defines the services provided by the application that are available for user customization using the wizard 200.

Interface 210 may display one or more options to be selected by the user. For example, interface 210 displays five user-selectable options 214. At least one of the options may receive input from a user when the user is navigating the wizard. In this embodiment, interface 210 is related to implementing an application related to business services, and provides many possible navigational options 214, including the account services option. Should a user select the account services option and click or select the next button 216, wizard 200 moves to the next interface 220.

Interface 220 provides instructions to the user via a dialog box 222, in order to guide the user and assist the user in navigating the wizard and building the code necessary to create a customized account service. Once the user selects the next button 224, the wizard presents the subsequent interface 230, related to business rules to implement in the customized account service. In this embodiment, the system presents two possible options 232, the "connection on demand" option and the "PIN block generation required" option. The user, via the interface 230 and graphical objects 232, is able to select whether to include either or both presented business rules in the customized account service. The system, upon receiving a user selection of one or more of the options 232 and a selection to proceed (next button 234), creates a configuration file 240 to be transmitted to the base application to update the base application with the customized business rules.

In some embodiments, the system generates a configuration file 240 (or similar file or data structure) that contains code related to user-selected options, such as those shown in FIG. 2. In some embodiments, the system generates information or other data used to generate code to be implemented into the customized application.

Figure 3:
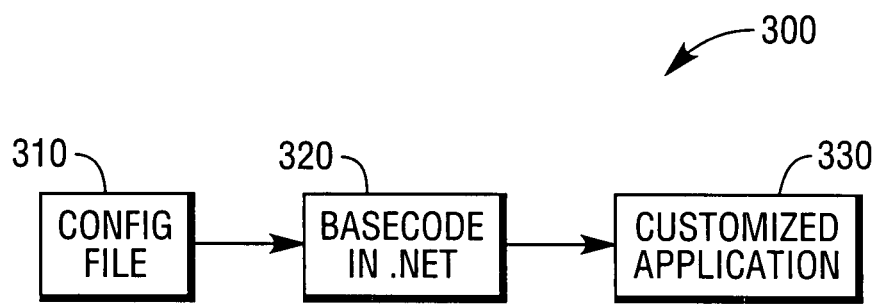
FIG. 3 is a process diagram illustrating process flows in implementing code for an application.

Referring to FIG. 3, a process diagram illustrating process flows 300 in implementing code for an application is shown. Component 310 is a configuration file 240 or other data structure created by a wizard using a graphical user interface. Component 310 may be data related to the customization of one service, or may be data related to some or many services. For example, the component 310 may contain data defining one business rule or many business rules to be implemented within the customized architecture.

The system may then transmit data contained in component 310 to component 320, which implements the data into a base architecture. For example, the system may transmit data related to one or more user-selected business rules to a .NET environment that is used to build the code for the customized application. The system may send multiple components 310 to the .NET environment that act as the building blocks for the code generation. The system, after creating the code for the customized application, creates the application and presents the application as component 330. For example, the system, after generating the code in the .NET Framework, implements the generated code as a computing network architecture that controls and monitors interactions between customers and ATMs. The architecture may relate to some of the interactions (such as specific to retail services) or may relate to all interactions.

Implementing the System for ATM Services and Functions

As discussed herein, developers create base applications in order to provide a base functionality for services and functions provided by automated teller machines. These applications may be generically configured to define the same rules and services for some or all third party users that purchase or otherwise obtain the applications. Thus, using the system, the third party users are able to create customized applications related to automated teller machines from the generic applications. The system, therefore, enables third party developers and other professionals to create these customized applications for use in providing financial and other transactional services.

Figure 4:
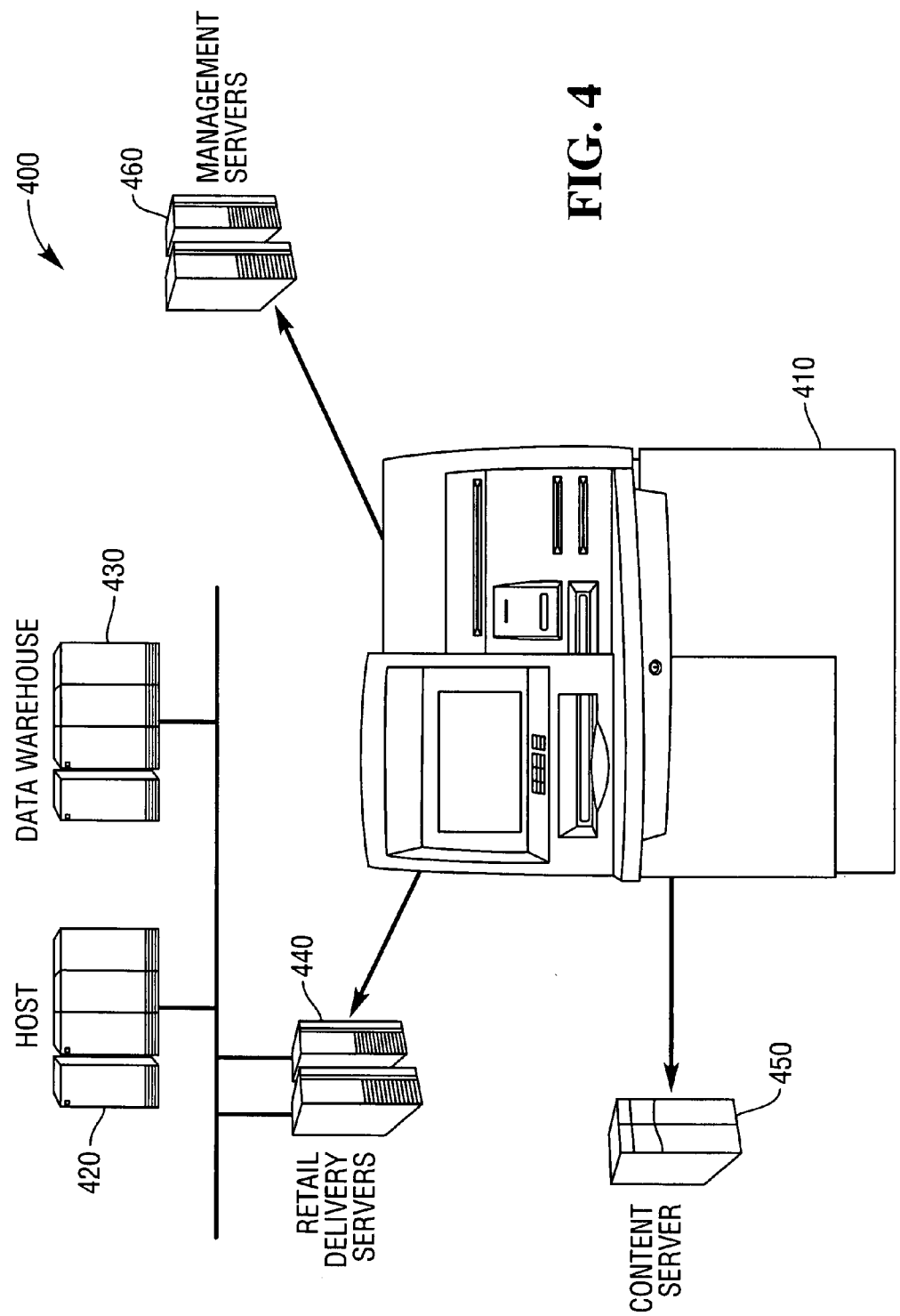
FIG. 4 is a block diagram illustrating components of an automated teller machine environment.

Referring to FIG. 4, a block diagram illustrating components of an automated teller machine environment 400 is shown. The environment 400 may include an end terminal, such as an automated teller machine 410. Machine 410 may provide a variety of services to customers of the machine, including dispensing of cash and other items (stamps, pre-paid cards, and so on), displaying customer account information, receiving deposits and other items, providing other account transactions such as account transfers, and so on.

In the environment 400, ATM 410 is connected to a host computing system 420, which may include a data warehouse 430 that stores customer information, account information, record information, history information, and so on. The host computing system 420 may also include a content server 450 that facilitates the presentation of a graphical user interface to customers, management servers 460 that manage, facilitate, and/or control interactions between components of the environment 400, and retail delivery servicers 440 that facilitate, manage, and/or control retail services provided by the ATM 410. Communications between components in the environment 400 may be via a network, such as a local area network (LAN), wide area network (WAN), wireless network, and so on.

Figure 5:
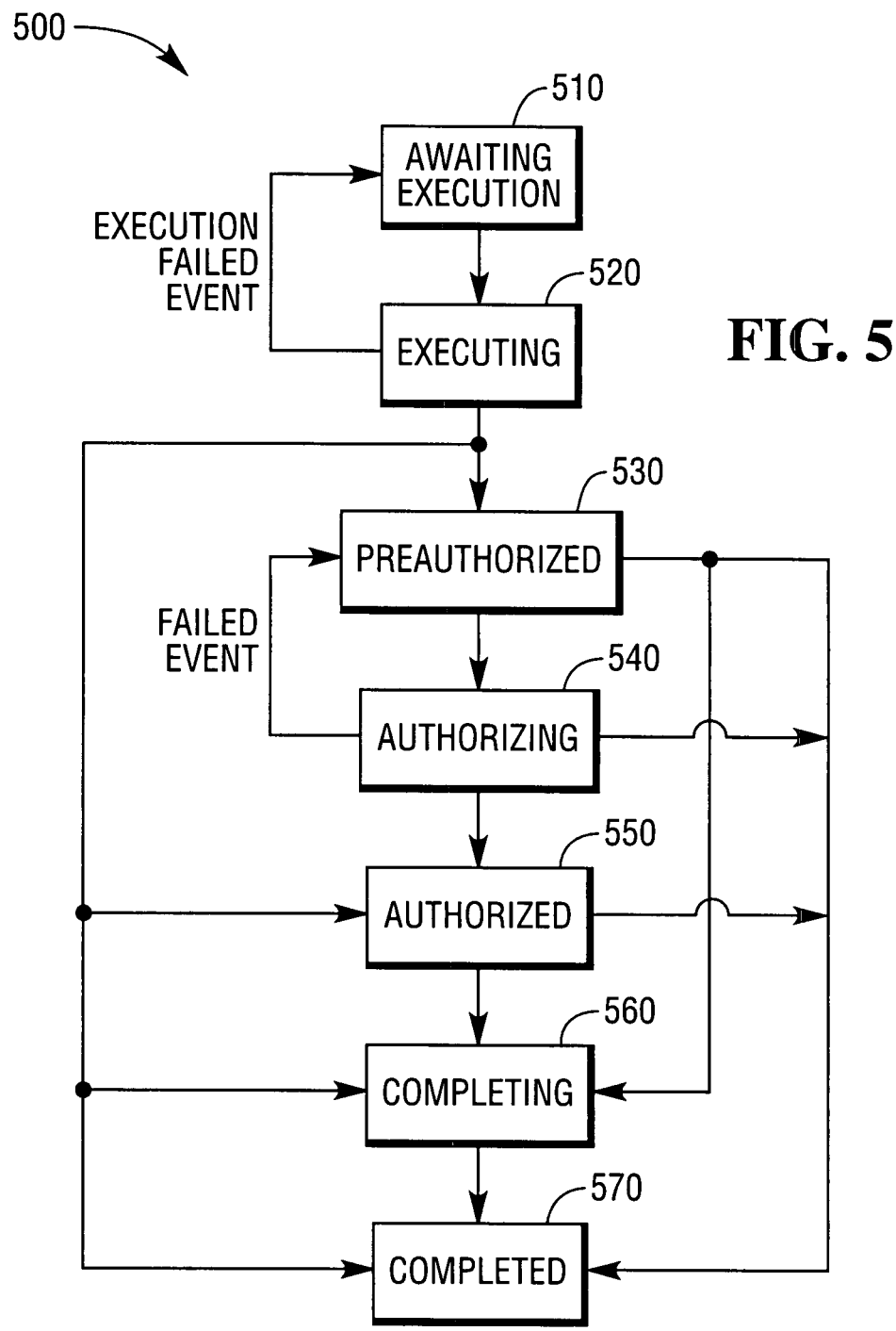
FIG. 5 is a process diagram illustrating process flows between an automated teller machine and a host computing system.

In some embodiments, the system enables users to implement the business rules that govern interactions, messages, actions, and other flows between components of the environment 400. Referring to FIG. 5, a process diagram illustrating process flows 500 between an automated teller machine and a host computing system is shown. In the Figure, blocks 510-570 refer to a status of one or more services or functions at or related to ATM 410 and the arrows refer to data flows to and from ATM 410. The system allows users to customize the application to define the messages transmitted between components of the environment 400 (such as during data flows) and to define actions taken by the ATM and other components (such as during events at the blocks 510-570). Events may occur when the ATM 410 is awaiting execution of a service 510, executing the service 520, during a pre-authorization of the service 530, when the ATM is authorizing a customer card or account 540, when the card or account is authorized 550, when the ATM is completing the service 560, or when the service is completed 570.

Using the system, users are able to customize how the ATM 410 and related environment 400 performs when events occur during the various processing stages described in steps 510-570. Users may customize what messages are sent, what processes are performed, what actions are performed, and so on. Additionally, the system enables users to customize the messages sent or actions performed during process flows between stages.

Figure 6:
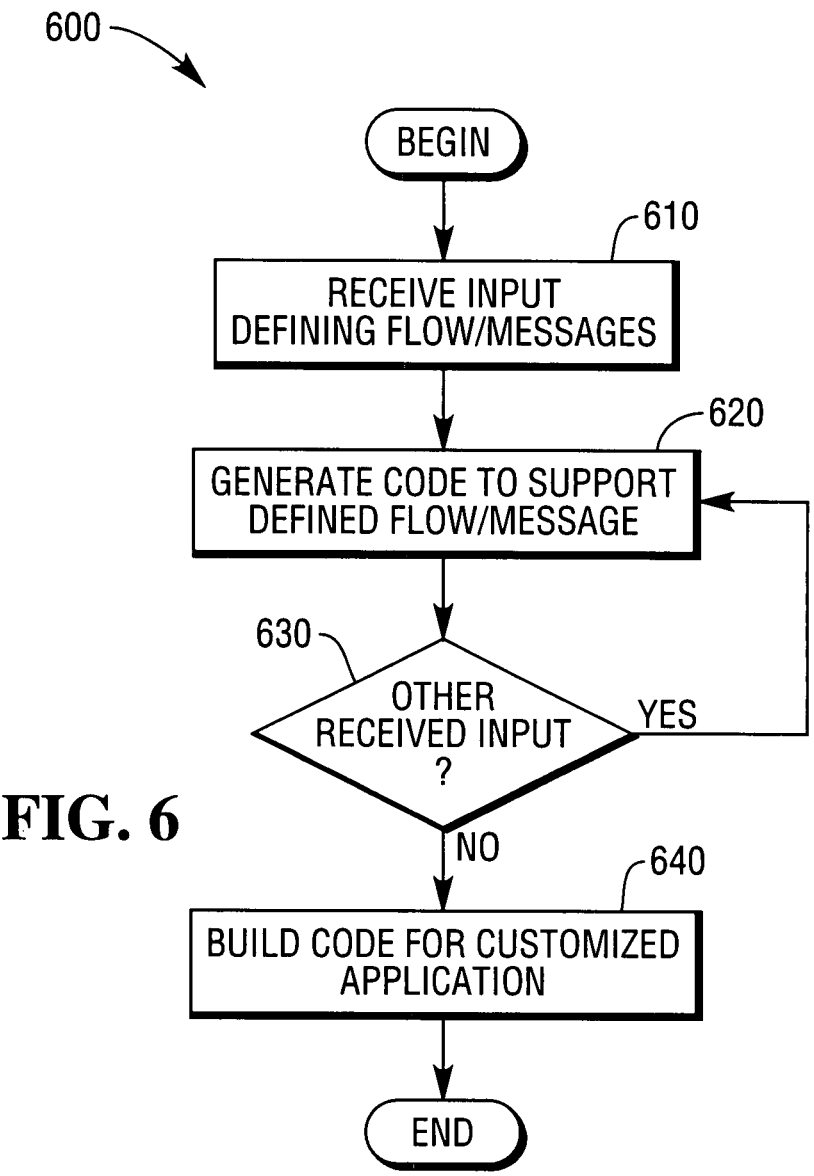
FIG. 6 is a flow diagram illustrating a routine for creating a customized application for an automated teller machine.

Referring to FIG. 6, a flow diagram illustrating a routine 600 for creating a customized application for an automated teller machine is shown. In step 610, the system receives input from a user related to one of the process flows shown in FIG. 5. For example, the system receives a user selection to define a message or action when a user card is authorized in block 550. The system may receive the selection within a launched wizard or within other programs or modules that enable a user to define where in the environment or processing tasks to modify the application. In this embodiment, the system receives a selection from the user to send a specific message from the ATM 410 to the host computing system 420 when a card is authorized, such as a message that logs the transaction. In some cases, the system may receive a selection that defines multiple messages to be sent and multiple actions to be performed. For example, the system may send the log message and may send a message to the data warehouse 430 that updates a data structure related to the user's account to indicate the user was authorized at the ATM 410.

In step 620, the system, upon receiving input from the user, generates code or similar data that supports or facilitates the implementation of the desired messages and/or actions. For example, the system generates a configuration file that contains data related to the user selections. In step 630, the system determines if other user selections have been received. If other selections have been received, routine 600 proceeds back to step 620, and the system generates additional data related to the additional user selections, else routine 600 proceeds to step 640.

In step 640, the system builds the code for the customized application, including the code for the user selections. For example, the system builds code that implements the messages discussed above, and creates a customized architecture to be deployed to environment 400. In some embodiments, skeleton code can be produced by using the CodeDom, a library of classes provided by the .NET Framework. The contents of these classes are then produced by interrogating an extensible markup language (XML) file which has been created by the wizard after the user has entered his choices. The wizard code engine can receive the contents of the XML and generate the code. Generated code can utilize base code (software development kit (SDK) code) which has default functionality. The rules as defined in the XML can be used to alter the behavior of the default code as desired.

As discussed herein, the system may facilitate user customization of rules related to actions performed during certain events at an ATM 410 and during certain process flows between the ATM 410 and other components in environment 400. The following is a list describing exemplary events and/or process flows (the list is not exhaustive, and the system may facilitate the customization of rules for other actions or flows not expressly disclosed):

1. When the event relates to a card not authorized by the ATM 410, a user may select rules that define messages to be sent to an anti-fraud facility, to a user account facility, and may select rules that define an action to be performed at the ATM 410, such as the ATM keeping the un-authorized card. The system may facilitate these user selections using the processes and wizard described herein.

2. When the event relates to a successful transaction involving dispensing money to a customer, a user may select rules that define messages to be sent to an account facility to update a user account, and may select rules that define an action to be performed at the ATM 410, such as the ATM closing the dispending area and displaying a successful message to the customer.

Systems and methods are described herein that facilitate the generation of code for customized applications using graphical elements presented to users. In some embodiments, the system presents a wizard that guides a user through various selections of options related to business rules, receives selections of desired options via a graphical user interface, and generates code based on the selections. In some embodiments, the system is configured to facilitate the creating of customized applications that provide a computing architecture for business services, such as business services provided to customers at automated teller machines. The system may customize services for an entire architecture, for translets of the architecture, for specific services provided by the architecture, and so on. In sum, the system, in some embodiments, enables users to modify a small piece or a large portion of a base application without writing code directly to the application. This enables the user to customize the application with few or no coding errors while quickly modifying and inserting additional functionality.

Conclusion

The system, wizard tool, and/or processes described herein may be implemented on various computing systems or devices including personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

The system, wizard tool, and/or processes described herein may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments implementing the claims. Accordingly, the system is not limited except as by the appended claims.

The invention claimed is:

1. A method of customizing an application that facilitates services performed by an automated teller machine, the method comprising:

presenting an interface element to a user, the interface element presented by a wizard application, wherein the interface element includes two or more user-selectable options related to functionality of the application, at least one of the user-selectable options related to at least a portion of pre-generated code and the functionality of the application interacts with or supports one or more translets, the one or more translets are components that provide types of services to the user on the automated teller machine (ATM);

receiving a selection of one of the options from the user using the wizard application, the selection customizes how the ATM performs when custom events are detected to alter what specific messages are sent, what processes are performed, what specific actions are taken, and what specific processes are performed between processing stages of the ATM, and the custom events occur when the ATM is executing the application;

retrieving the portion of generated code related to the selected option using business rules defined in the selected option to build the portion of the generated code, the portion of the generated code built as a computing network architecture that controls and monitors interactions between customers and the ATM and relates to some interactions, the business rules customized by the user and defining processing flows for the translets;

generating a file containing the portion of generated code, wherein the file is created by the wizard application as a configuration file; and implementing the file into the automated teller machine application to modify the functionality of the application by the wizard application applying the configuration file on the generated code.

2. The method of claim 1, wherein the interface element contains graphical elements displayed to the user that contain the two or more user-selectable options.

3. The method of claim 1, wherein the selecting is received via a graphical element within the interface element that relates to the user-selectable option.

4. A system for creating a customized application for an automated teller machine, the system comprising:

a server having one or more processors and memory with a base application, wherein the base application implements an environment for transactional services provided by the automated teller machine: and the one or more processors and the memory of the server also having a wizard application, wherein the wizard application receives selections of features from a user and adds the features to the base application and the base application interacts with or supports one or more translets and the user customizes business rules for the translets, the one or more translets are components that provide types of services to the user on the automated teller machine (ATM), the selection customizes how the ATM performs when custom events are detected to alter what specific messages are sent, what processes are performed, what specific actions are taken, processing flows for the translets, and what specific processes are performed between processing stages of the ATM, and the custom events occur when the ATM is awaiting execution of the base application, and the selection defines business rules for generating code within the ATM to provide the features, the code generated as a computing network architecture that controls and monitors interactions between customers and the ATM and relates to some interactions, and wherein the wizard application creates a configuration file to be applied to the code of the base application.

5. The system of claim 4, wherein the wizard application receives the selections of features via a graphical user interface displayed to the user.

6. The system of claim 4, wherein the wizard application generates the code related to the selected features, further comprising:

an implementation application, wherein the implementation application receives the generated code and applies the code to the base application.

7. The system of claim 4, wherein the wizard application provides instructions to the user via graphical objects within the base application.

8. A method of generating a customized application for a user, the method comprising:

launching a wizard, wherein the wizard provides instructions to the user and receives input from the user related to the instructions via a graphical user interface;

receiving input from the user via the graphical user interface, wherein the input provides an indication of a user selected function, and the input captured as a configuration file by the wizard application;

generating source code related to the received input based on business rules defined in the input, the source code built as a computing network architecture that controls and monitors interactions between customers and an Automated Teller Machine (ATM) and relates to some interactions, the business rules customized by the user and define processing flows for the source code, the business rule captured in the configuration file by the wizard application; and implementing the generated source code into an application to customize the application for the user by the wizard application applying the configuration file to the generated source code, the application interacts with or supports one or more translets, the one or more translets are components that provide types of services to the user on the ATM, the user selected function customizes how the ATM performs when custom events are detected to alter what specific messages are sent, what processes are performed, what specific actions are taken, and what specific processes are performed between processing stages of the ATM, and the custom events occur when the selected function is completed.

9. The method of claim 8, wherein the input is received via a graphical object within the graphical user interface.

10. A non-transitory computer-readable medium whose contents cause a computing system to perform a method of implementing a message to be transmitted between an automated teller machine and a host machine, the method comprising:

receiving an indication from a user to implement the message, wherein the indication relates to a task performed at the automated teller machine;

displaying a graphical element to the user, wherein the graphical element presents one or more user-selectable options related to the task;

receiving a selection from the user of the one or more user-selectable options, wherein the selection relates to the message and the selection captured as a configuration file by a wizard application; and implementing the message based on the received selection by the wizard application applying the configuration file on the message, the received selection defines customized business rules for generating the task, the task interacts with or supports one or more translets, the one or more translets are components that provide types of services to the user on the automated teller machine (ATM), the tasks generated as a computing network architecture that controls and monitors interactions between the user and the ATM and relates to some interactions, the user-selected options customize how the ATM performs when custom events are detected to alter what specific messages are sent, what processes are performed, processing flows for the translets, what specific actions are taken, and what specific processes are performed between processing stages of the ATM, and the custom events occur when the ATM is pre-authorizing the task for execution.

11. A non-transitory computer-readable medium whose contents cause a computing system to perform a method of implementing an action to be performed within a transactional services environment including an automated teller machine and a host machine, the method comprising:

receiving an indication from a user to implement the action, wherein the indication relates to an event that occurs at the automated teller machine (ATM);

displaying a graphical element to the user, wherein the graphical element presents one or more user-selectable options related to the event;

receiving a selection from the user of the one or more user-selectable options, wherein the selection relates to the action, and the selection captured as a configuration file by a wizard application; and implementing the action to be performed based on the received selection using customized business rules defined in the selection, the wizard application applies the configuration file on the action, and the action interacts with or supports one or more translets, the one or more translets are components that provide types of services to the user on the ATM, the action implemented as a computing network architecture that controls and monitors interactions between the user and the ATM and relates to some interactions, the indication customizes how the ATM performs when custom events are detected to alter what specific messages are sent, what processes are performed, processing flows for the translets, what specific actions are taken, and what specific processes are performed between processing stages of the ATM, and the custom events occur when the ATM is authorizing a customer account.

12. A system for creating a customized application for an automated teller machine (ATM), the system comprising:

a server having one or more processors and memory with a base application for implementing an environment for transactional services provided by the ATM; and a wizard application that executes on the server and configured and adapted to: receive selections of features from a user captured as a configuration file, and add the features to the base application using customized business rules defined in the selections of the configuration file by applying the configuration file to the base application, wherein the features generated as a computing network architecture that controls and monitors interactions between customers and the ATM and relates to some interactions, the base application interacts with or supports one or more translets, the one or more translets are components that provide types of services to the user on the ATM, the selections customize how the ATM performs when custom events are detected to alter what specific messages are sent, what processes are performed, processing flows for the translets, what specific actions are taken, and what specific processes are performed between processing stages of the ATM, and the custom events occur when the ATM authorizes a customer account.

13. The system of claim 12, wherein the further wizard application is further adapted and configured to provide instructions to the user via graphical objects within the base application.

* * * * *